United States Patent [19]

Frederick

[11] Patent Number: 4,533,306
[45] Date of Patent: Aug. 6, 1985

[54] APPARATUS FOR MAINTAINING LEVEL OF LIQUID-GAS INTERFACE IN A VULCANIZING TUBE

[75] Inventor: John C. Frederick, Yuba City, Calif.

[73] Assignee: Pirelli Cable Corporation, Union, N.J.

[21] Appl. No.: 546,857

[22] Filed: Oct. 31, 1983

[51] Int. Cl.³ .............................................. B29H 5/28
[52] U.S. Cl. ..................................... 425/71; 425/445
[58] Field of Search .............................. 425/3, 67–71, 425/445, 446, 472, 815, 72 R, 113, 404; 73/308, 313; 200/84 C; 137/386, 391, 392, 395, 209, 210; 340/618, 623; 222/67, 64; 417/130, 131

[56] References Cited

U.S. PATENT DOCUMENTS

| | | | |
|---|---|---|---|
| 3,003,515 | 10/1961 | Moberly | 137/210 |
| 3,046,475 | 7/1962 | Binford | 73/308 |
| 3,351,084 | 11/1967 | Halkiades | 73/308 |
| 3,484,774 | 12/1969 | Borgnakke | 73/313 |
| 3,495,456 | 2/1970 | Ohno | 73/313 |
| 3,703,246 | 11/1972 | Horak | 222/67 |
| 4,029,450 | 6/1977 | Caser | 425/445 |
| 4,054,295 | 10/1977 | Elliott | 200/84 C |
| 4,179,256 | 12/1979 | Tomioka et al. | 425/384 |
| 4,259,975 | 4/1981 | Kinsey et al. | 200/84 C |
| 4,387,434 | 6/1983 | Moncrief et al. | 137/392 |

OTHER PUBLICATIONS

Anon., Transamerica Delaval, Inc., Bulletin "Suresite Level Indicators".

Primary Examiner—Willard E. Hoag
Attorney, Agent, or Firm—Brooks, Haidt, Haffner & Delahunty

[57] ABSTRACT

A measuring tube containing a permanent magnet on a float is connected to a tube, containing steam and water for vulcanizing and cooling the insulation on an electric cable, so that the water-steam interface in the measuring tube corresponds to the water-steam interface in the vulcanizing tube. The magnet position corresponds to the water-steam interface and operates switches external to the measuring tube and connected to a voltage divider so that the output voltage of the divider corresponds to the water-steam interface. The voltage output of the divider is compared with pre-set voltages and differences between the voltages are used to control pumps, valves, etc., so as to maintain the water-steam interface at the desired level and the voltage output of the divider is used to operate lamps, and/or alarms, and valves when the interface is excessively high or low.

14 Claims, 6 Drawing Figures

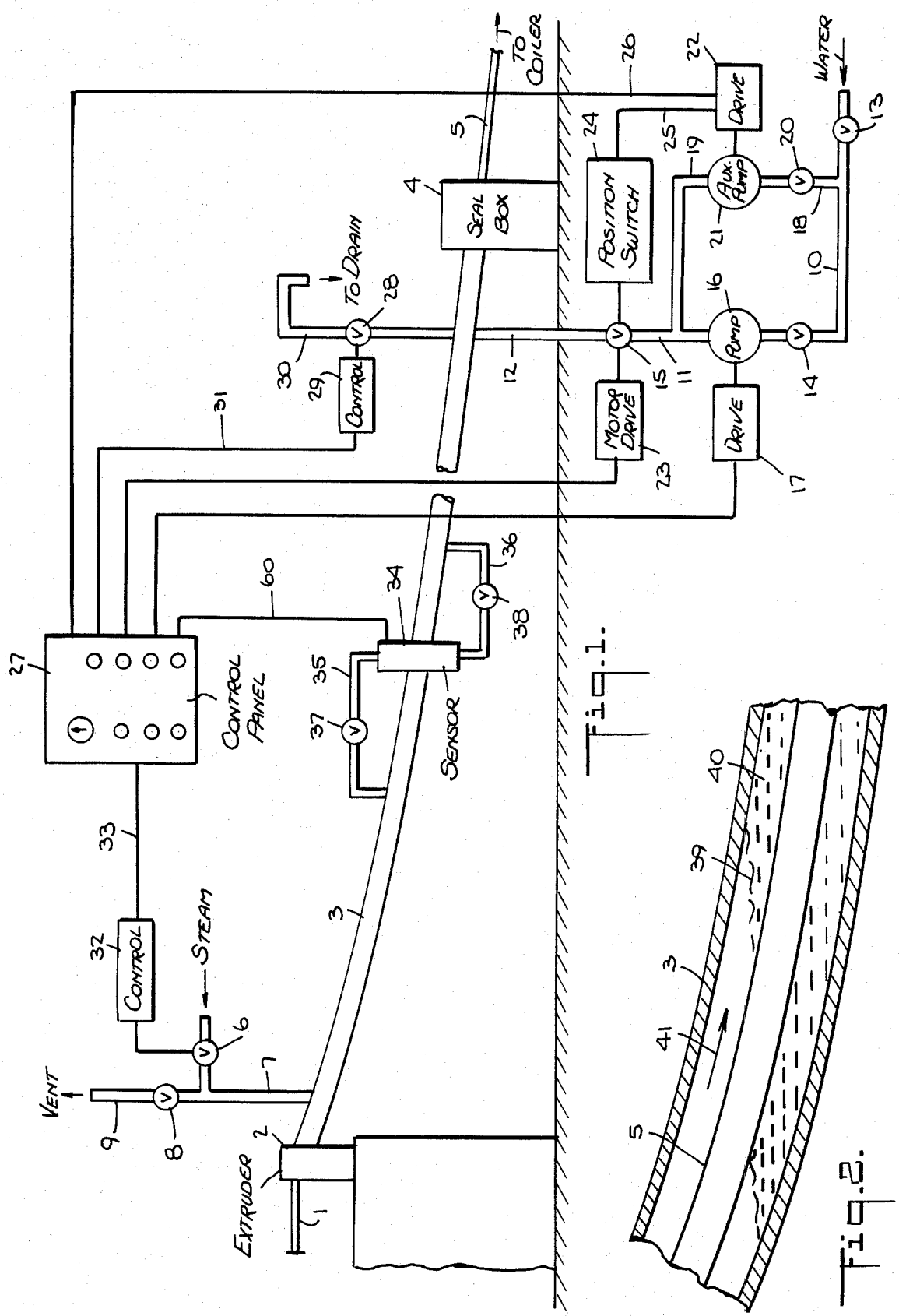

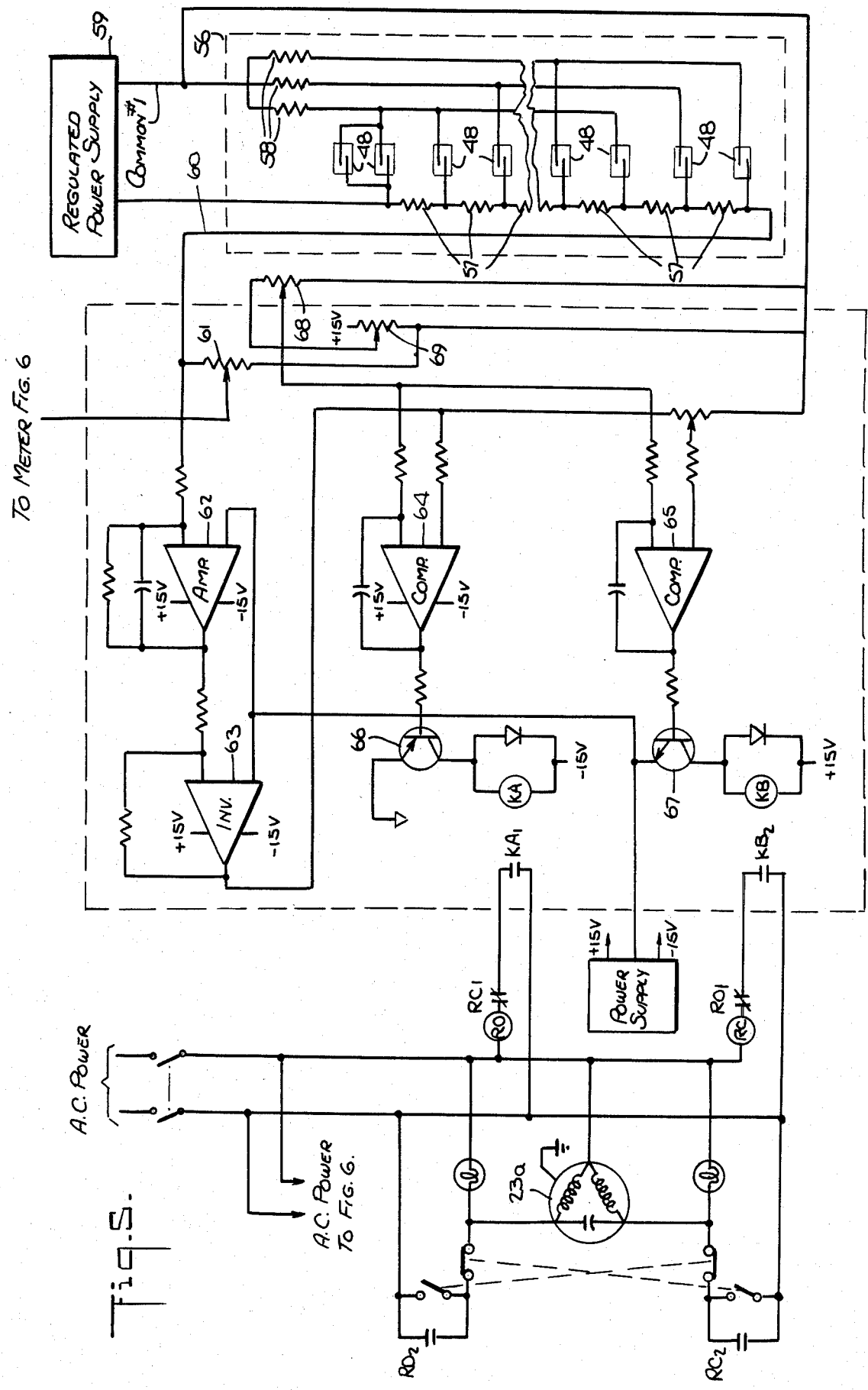

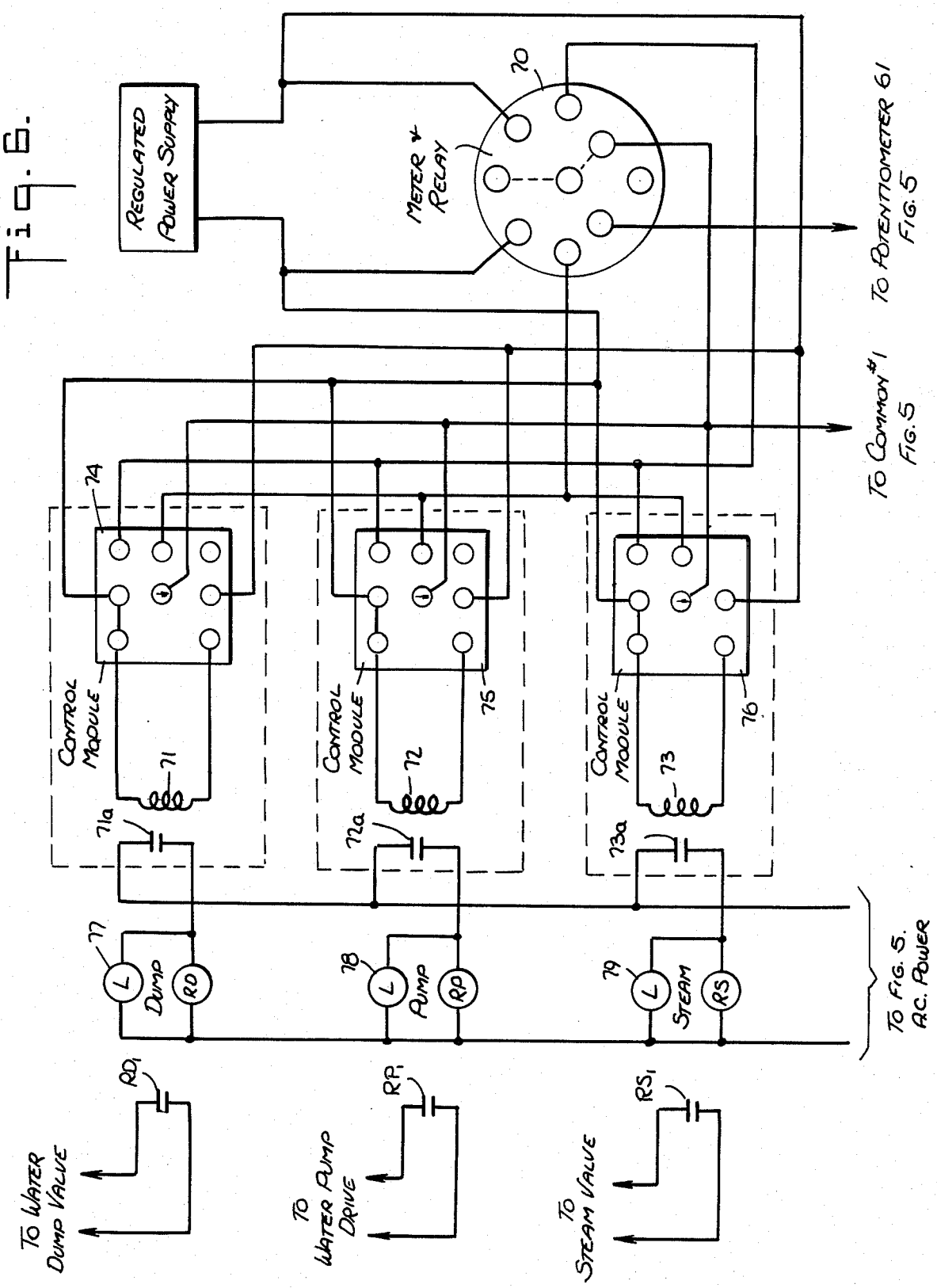

APPARATUS FOR MAINTAINING LEVEL OF LIQUID-GAS INTERFACE IN A VULCANIZING TUBE

This invention relates to apparatus for maintaining the liquid level in a vessel at a predetermined level when the level of the liquid therein tends to vary and relates, particularly, to apparatus for maintaining at a predetermined level the steam-water interface in a catenary tube commonly employed for the continuous vulcanization of a layer of insulation around a conductive core of an electrical cable.

Apparatus for the continuous vulcanization or polymerization of the insulating material around the conductive core of an electric power cable in which the core with the insulating material therearound is advanced through a fluid-tight, vulcanizing tube containing steam and water is well known in the art. See, for example, U.S. Pat. Nos. 2,561,820 and 2,608,718. In such apparatus, one end of the vulcanizing tube is connected in fluid-tight relation at one end with the output of an extruder which applies the insulating material over the cable core as it is advanced therethrough and through the tube. The other end of the tube is connected in fluid-tight relation to a sealing box. The portion of the tube, nearer the extruder, is supplied with steam at a temperature which will cause vulcanization (or polymerization) of the insulating material and the other portion of the tube is supplied with water for cooling the insulation. Normally, the steam and water are supplied at relatively high pressures. For proper vulcanization, it is important that the steam-water interface within the tube be maintained within relatively narrow limits. In some cases, the vulcanizing tube has the shape of a catenary and is called a catenary tube.

Although systems for controlling the level of the steam-water interface are known in the art, such as the Leslie-levelmatic pilot controller and a differential pressure cell system, sometimes called the "Sikora" system, all of such systems have disadvantages, such as cost, the need for auxiliary devices, and less than satisfactory reliability, ease of maintenance, ease of operation and control precision.

One object of the invention is to provide a liquid level control system which is less expensive, more reliable and easier to operate and maintain than prior art liquid level control systems.

Another object of the invention is to provide a liquid level control system which will automatically maintain the desired liquid level more precisely than prior art systems.

A further object of the invention is to provide a liquid level control system which does not require auxiliary pneumatic, hydraulic or mechanical devices to accomplish the desired control.

In the preferred embodiment of the invention, a measuring tube, which is connected at its opposite ends, respectively, to the upper and lower portions of a catenary tube for fluid flow between the catenary tube and the measuring tube, contains a permanent magnet which can float on the top of the liquid in the measuring tube. Exterior to the measuring tube are a plurality of magnetically operable switches and a plurality of magnetically operable indicators which are responsive to the position of the magnet. The switches control a voltage source so that the magnitude of the output voltage of the source varies with the position of the magnet, and the output voltage is compared with a reference voltage. Any difference between the output voltage of the magnet controlled source and the reference voltage is used to control the valve which controls the supply of liquid to the catenary tube. The output voltage of the voltage source is also supplied to a display panel and through appropriate control devices, is also used to control one or more of a liquid dump valve, a back-up pumping system and a steam cut-off valve normally associated with the catenary tube.

Other objects and advantages of the present invention will be apparent from the following detailed description of the presently preferred embodiments thereof, which description should be considered in conjunction with the accompanying drawings in which:

FIG. 1 is a schematic diagram of the apparatus of the invention in association with apparatus for extruding a layer of insulation around the conductor and for vulcanizing the insulation;

FIG. 2 is an enlarged fragmentary side elevation view, partly in cross-section, of the vulcanizing tube adjacent to the sensor shown in FIG. 1;

FIG. 5 is a circuit diagram of the portion of the apparatus of the invention employed to control the water level in the vulcanizing tube; and FIG. 6 is a circuit diagram of another portion of the apparatus of the invention employed to control components illustrated in FIG. 1.

Figure 4:
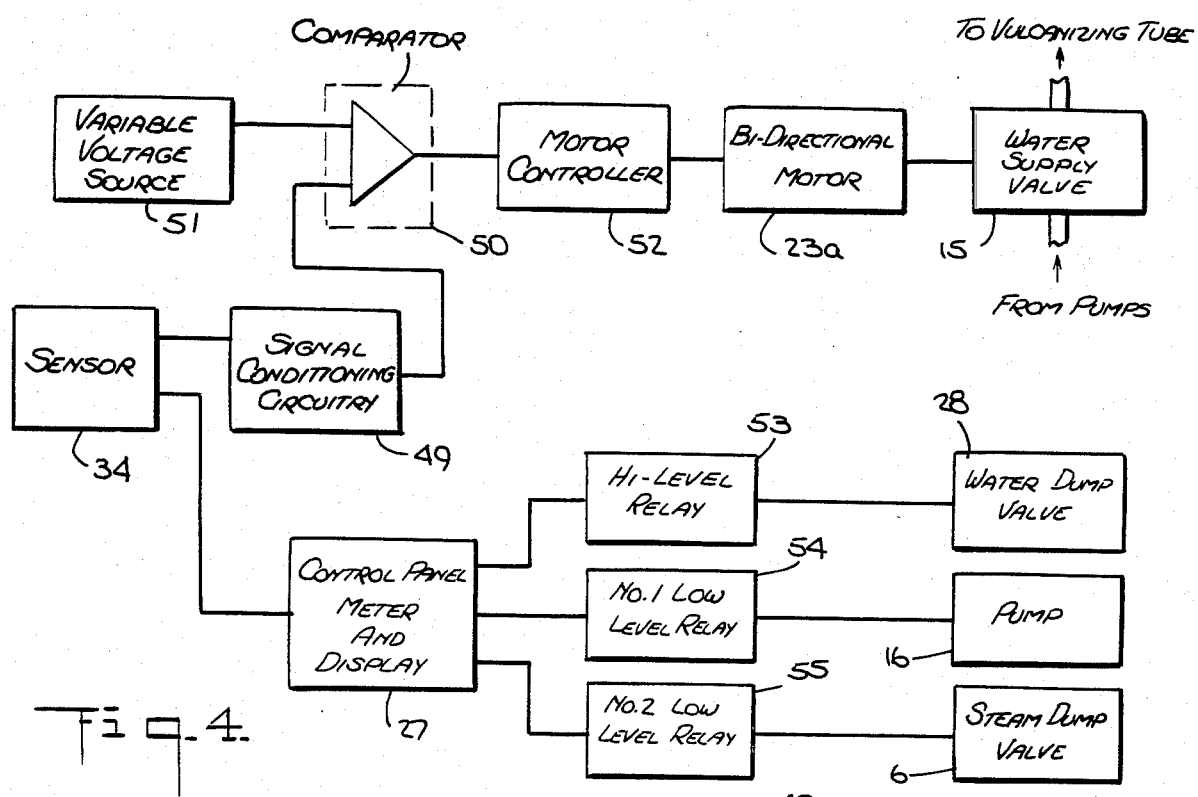
FIG. 4 is a block diagram of apparatus forming part of the invention.

For purposes of illustration, the invention will be described in connection with apparatus employed to apply vulcanizable or polymerizable insulating material to the conductor of an electric cable and for vulcanizing or polymerizing such insulating material in a vulcanizing tube, but it will be apparent to those skilled in the art that the apparatus of the invention may be employed for controlling or maintaining the liquid level in vessels other than a vulcanizing tube. As used herein and in the claims, vulcanizable and polymerizable are used interchangeably.

FIG. 1 illustrates the apparatus of the invention in association with conventional apparatus for applying vulcanizable material to a conductor 1 by means of an extruder 2 and, thereafter, vulcanizing the vulcanizable insulating material in a vulcanizing tube 3 having the shape of a catenary. The tube 3 has a fluid-tight connection with the extruder 2 at one end and a fluid-tight connection at the opposite end with a seal box 4.

The conductor 1 is advanced continuously to the extruder 2 and passes through the vulcanizing tube 3 to the seal box 4, and from the seal box 4, the conductor 1 with the vulcanized insulation thereon, identified by the numeral 5, passes to a conventional coiler (not shown).

The upper portion of the tube 3, that is, the portion of the tube 3 nearer the extruder 2, is supplied with steam, by way of a cut-off valve 6 and a pipe 7, which is at a temperature appropriate for causing vulcanization of the insulating material. In the event that it is necessary to vent the steam, the valve 8, which is normally closed, may be open to vent the steam to the atmosphere by way of the pipe 9. The steam is, of course, supplied at a pressure above atmospheric pressure.

Water under pressure is supplied to the lower portion of the vulcanizing tube 3, that is, to the portion of the vulcanizing tube 3 which is nearer the seal box 4, by way of pipes 10, 11 and 12, valves 13, 14 and 15 and a pump 16 which is driven by motor means 17, such as an electric motor.

Water under pressure may also be supplied to the lower portion of the vulcanizing tube 3 by way of pipes 18 and 19, valve 20 and an auxiliary pump 21 which is driven by motor means 22, such as an electric motor.

The valve 15 is operable by a bi-directional motor drive 23 and may be associated with a position switch 24 which closes when the valve 15 is about 88% open. The motor means 22 may be energized by the switch 24 by way of an electric line 25 connected to the position switch 24 or by way of the electric line 26 which extends to the control panel 27.

When it is desired to discharge water from the lower end of the vulcanizing tube 3, the valve 28 which is operable by the electrically operable control 29 may be opened to discharge water by way of the pipe 30 to a drain. The control 29 is connected by way of an electric line 31 to the control panel 27.

The cut-off valve 6 and/or the steam vent valve 8 may also be operated by an electrically operable control 32 which is connected to the control panel 27 by way of an electric line 33.

Figure 3:
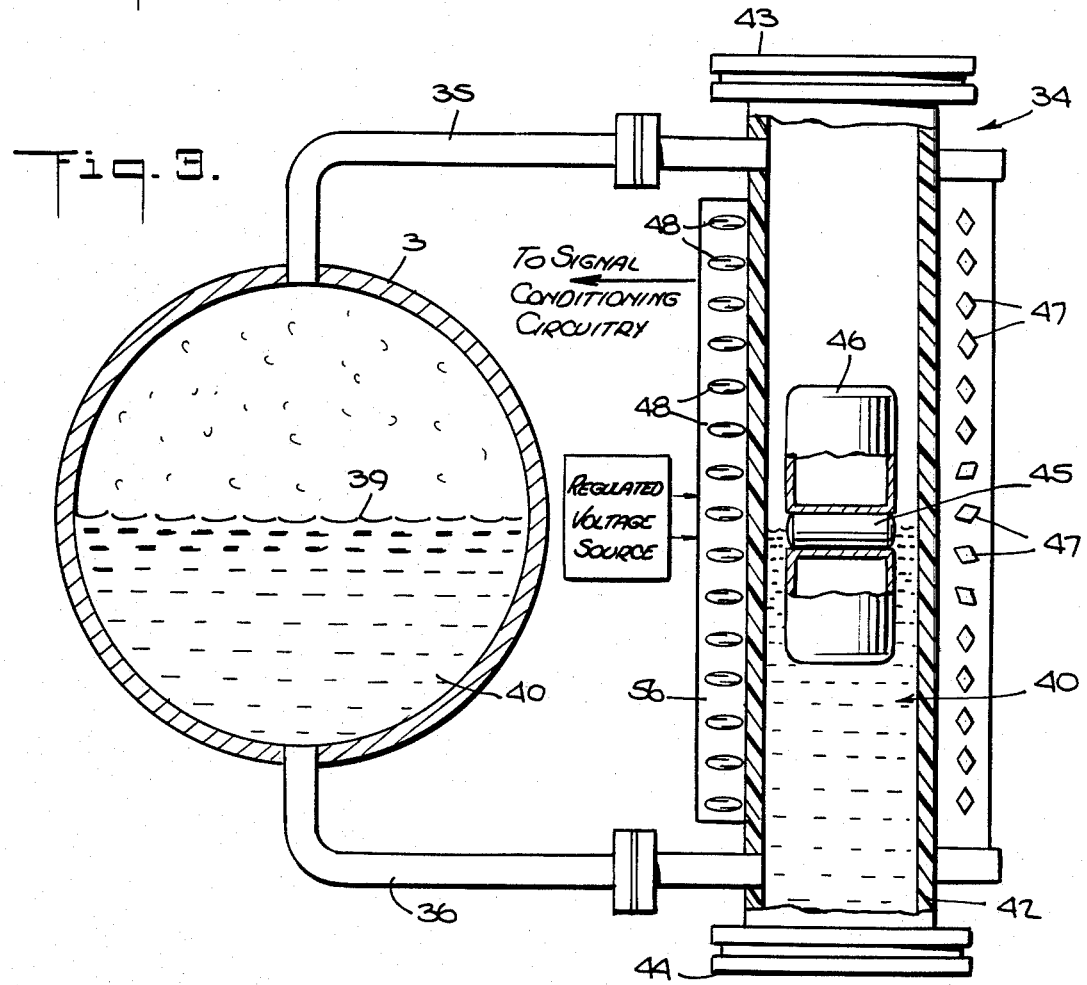
FIG. 3 is a schematic diagram illustrating details of the sensor shown in FIG. 1 connected to the vulcanizing tube.

A level sensor 34, which will be described hereinafter in further detail in connection with FIG. 3 is connected to the vulcanizing tube by way of pipes 35 and 36 and valves 37 and 38 and is positioned such that there is a steam-water interface within the sensor 34, such interface preferably being approximately midway of the ends of the sensor 34 when the steam-water interface in the tube 3 is at the proper level.

As is known in the art, the pressure of the steam and the pressure of the water are adjusted so that there is an interface between the water and the steam within the vulcanizing tube 3. It is also known in the art that for proper vulcanization, it is important that the steam-water interface within the tube 3 be maintained within relatively narrow limits.

FIG. 2 illustrates the steam-water interface, at 39, within the vulcanizing tube 3, the upper level of the water 40 defining the interface and the portion of the vulcanizing tube 3 above the interface 39 being occupied by steam under pressure. The conductor 1 with the insulation therearound, identified by the numeral 5, is advanced in the direction of the arrow 41 and enters the water 40, when the insulation has become vulcanized due to the steam, for cooling purposes.

With reference to FIG. 3 which shows the sensor 34 connected to the vulcanizing tube 3, but with the insulated conductor 5 and the valves 37 and 38 omitted, the sensor 34 comprises a hollow cylinder or tube 42 which is closed at its ends in a fluid-tight manner, such as, by covers 43 and 44. The tube 42 may be made of various materials, but preferably, it is made of a metal such as stainless steel. No commercially available level sensor has the construction of the sensor shown in FIG. 3, but the sensor 34 is a combination of features of the model TLI level sensing unit and the level indicators manufactured and sold by the Gems Sensors Division of Trans-America Delaval, Inc., Plainville, Connecticut, the level indicators being sold under the trademark SURE-SITE. In the model TLI level sensor unit, a probe containing reed switches and resistors is inserted in the liquid, the level of which is to be measured, and the probe is surrounded by a permanent magnet which floats on the liquid. With the temperatures and pressures involved in the vulcanizing tube 3, it is impractical to use such a probe. Accordingly, a level indicator of the type identified, which has a magnet within a tube which will float on the liquid within the tube and which operates "flags" external to the cylinder, is modified to add reed switches and resistors external to the cylinder, such reed switches being operable by the floating magnet which also operates the "flags".

Again, with reference to FIG. 3, the sensor 34 comprises a permanent magnet 45 mounted on a float 46 which causes the permanent magnet 45 to be positioned substantially at the upper level of the water 40 within the cylinder 42. Outside, and adjacent to, the tube 42, there is a plurality of flags 47 which are pivotal by the magnet 45 in the same manner that such flags are pivotable in the SURESITE level indicators.

Also, outside, and adjacent to, the tube 42 is a plurality of reed switches 48 connected to resistors and operable by the permanent magnet 45 in the same manner in which reed switches are operated in the model TLI level sensing unit identified hereinbefore.

Accordingly, the upper level of the water 40 in the tube 42 is at the same level as the interface 39, and the magnet 45, at the upper level of the water 40 in the tube 42, closes the reed switches 48 adjacent thereto and pivots the flags 47 adjacent thereto. Therefore, the flags 47 indicate the upper level of the water 40 in the tube 42, and the reed switches 48 vary the magnitude of the voltage output of the voltage divider in the manner described hereinafter. Thus, as the magnet 45 rises, the voltage output of the voltage divider increases and vice-versa.

With reference to the block diagram of FIG. 4, the reed switch portion of the sensor 34 provides voltages to a signal conditioning circuitry 49 and to the control panel 27 which includes a water level indicting meter, alarms and control buttons. The signal conditioning circuitry 49 changes the stepped voltage, which is produced at the output of the voltage divider, to a voltage which varies linearly in magnitude with operation of the reed switches 48. The linear voltage is inverted with respect to the input voltage and is again inverted so that the output voltage of circuitry 49 varies in the same direction as the input voltage. The output of the signal conditioning circuitry 49 is applied to a comparator unit 50 which is also supplied with a reference voltage from the variable voltage source 51. When the voltage supplied by the signal conditional circuitry exceeds the voltage supplied by the source 51, a motor controller 52, which controls a bi-directional motor 23a forming part of the motor drive for the valve 15 as shown in FIG. 1, operates to cause the water supply valve 15 to operate in the closing direction thereby to decrease the supply of water to the vulcanizing tube 3.

Conversely, when the voltage output of the signal conditional circuitry 49 is less than the voltage supplied to the comparator unit 50 by the source 51, the motor controller causes the bi-directional motor 23a to operate the valve 15 in the opposite direction.

The voltage supplied to the control panel 27 by the sensor 34 is used to control three relays 53, 54 and 55 which, respectively, operate the water discharge or dump valve 28 to discharge water from the vulcanizing tube 3, operate the pump 16 and/or the pump 21 so as to increase the supply of water to the vulcanizing tube 3 and operate the steam vent valve 8 to exhaust steam from the upper portion of the vulcanizing tube 3 and/or the cut-off valve 6 to stop the supply of steam to the tube 3. Thus, if the water in the vulcanizing tube 3 exceeds a predetermined level, the relay 53 operates the valve 28 to discharge water from the vulcanizing tube 3. When the water level in the vulcanizing tube reaches a predetermined low level, the relay 54 causes operation of the pump 16 and/or the pump 21 in a manner to increase the supply of water to the vulcanizing tube 3. Also, when the water level in the vulcanizing tube decreases further, the relay 55 operates the valve 6 to reduce the pressure of steam in the upper portion of the vulcanizing tube 3, and/or the valve 8 to stop the supply of steam to the tube 3, thereby preventing steam from reaching the seal box 4.

FIG. 5 is a circuit diagram of one embodiment of an electrical circuit for controlling the motor 23a, which operates the valve 15 (FIG. 1). The reed switches 48 may be contained in the same container 56 (FIGS. 3 and 5) as a plurality of resistors 57, forming a voltage divider, and current limiting resistors 58. Electric power is supplied to the resistors 57 and 58 and to the reed switch 48 by a voltage regulated power supply 59. The output of the voltage divider appears on the line 60 and varies in magnitude dependent on which of the switches 48 are closed. As the magnet 45 moves toward the bottom of the tube 42 by reason of a lowering of the water in the tube 42, the voltage on the line 60 decreases and as the magnet 45 goes upwardly in the tube 42 because of rising of the water in the tube 42, the voltage on the line 60 increases.

The line 60 is connected to a potentiometer 61, the movable arm of which is connected to a meter shown in FIG. 6. The line 60 is also connected to the input of an operational amplifier 62, which forms part of the signal conditioning circuitry 49, and the output of the amplifier 62 is supplied to an inverter 63 also forming part of the circuitry 49. It will be apparent that the voltage on the line 60 varies in steps because of the sequential actuation of the switches 48. For control purposes, the step voltage on the line 60 is converted in the operational amplifier 62 to an inverted voltage which varies linearly in magnitude and is again inverted in the operational amplifier 63 and supplied to the inputs of comparators 64 and 65 forming part of the comparator unit 50. The output of the comparator 64 is used to control a transistor 66 which operates a relay KA having normally open contacts $KA_1$. The contacts $KA_1$ control a relay RO which has contacts $RO_1$ and $RO_2$. When the contacts $RO_2$ are closed, the motor 23a operates in a first direction, and the contacts $RO_1$ open the circuit and prevents energization of the relay RC.

Similarly, the output of the comparator 65, is connected to a transistor 67 which controls the energization of a relay KB having normally open contacts $KB_2$. When the contacts $KB_2$ and the contacts $RO_1$ are closed, the relay RC is energized. The relay RC has contacts $RC_1$ and $RC_2$ and when contacts $RC_1$ are open by energization of the relay RC, energization of the relay RO is prevented. When the contacts $RC_2$ are closed by the relay RC, the motor 23a is energized for rotation in a direction opposite the direction in which it is operated when the contacts $RO_2$ are closed.

The comparators 64 and 65 may, for example, be a No. 1747 dual operational amplifier, as an integrated circuit, and the amplifier and inverters 62 and 63 may, for example be a No. 1458 dual operational amplifier, as an integrated circuit.

The reference voltage for the comparators 64 and 65 is supplied thereto by the movable arm of a potentiometer 68 which is connected between the common line and the movable arm of a potentiometer 69, the potentiometer 69 being connected between the common line and a voltage source, such as a source supplying a voltage of 15 volts. The arm of the potentiometer 69 is used to set the voltage applied to the potentiometer 68, e.g. 10 volts, and the arm of the potentiometer 68 is used to set the reference voltage for the comparators 64 and 65 and hence, the water level to be maintained by the motor 23 and the valve 15.

FIG. 6 is a combined block and circuit diagram of one embodiment of electrical apparatus which may be mounted on or at the control panel 27 shown in FIGS. 1 and 4. The apparatus shown in FIG. 6 comprises an indicating meter which may be a Simpson ANA/LED Panel Meter Model 7527 sold by Simpson Electric Co., Sub. of Katy Industries, Inc. 853 Dundee Avenue, Elgin, Ill. 60120. Such meter will indicate the water level and will provide an output depending on the magnitude of the voltage supplied thereto from the potentiometer 61 (FIG. 5) so as to operate, at appropriate times, the relays 71, 72 and 73 connected, respectively, to the outputs of control modules 74, 75 and 76. Each of the control modules may, for example, be a Simpson control module, Catalog #30205, sold by said Simpson Electric Co. with relay kits, Catalog #30210, which are also sold by said Simpson Electric Co. and which provide the relays 71–73.

When the contacts 71a of the relay 71 are closed, a relay RD and a lamp 77 are energized. The relay RD, when energized, closes its contacts $RD_1$ which opens the valve 28 (FIG. 1) to discharge water from the vulcanizing tube 3.

When the relay 72 is energized, it closes its contacts 72a which energizes the relay RP and the lamp 78. When the relay RP is energized, it closes its contacts $RP_1$ which modifies the speed of the drive 17 to increase the pumping rate of the pump 16 and/or energizes the drive 22 of the auxiliary pump 21 to place it in operation so as to assist the delivery of water to the vulcanizing tube 3 by the pump 16 (FIG. 1).

When the relay 73 is energized, it closes its contacts 73a which energizes the relay RS and the lamp 79. When the relay RS is energized, it closes its contacts $RS_1$ which closes the steam valve 6 and/or opens the steam dump valve 8 by way of the control 32 (FIG. 1).

Accordingly, when the voltage output of the sensor 34, which is the voltage on the line 60 in FIG. 5, is above a predetermined level indicating that the water level in the vulcanizing tube 3 is above a predetermined level, higher than the desired level, the output of the meter 70 causes energization of the relay 71 and causes opening of the valve 28. At the same time, it energizes the lamp 77 indicating to the operator at the control panel that the level in the vulcanizing tube is excessively high. Of course, the lamp 77 may be replaced by, or used in conjunction with, an alarm which is energized by way of the contacts 71a of the relay 71.

Similarly, when the voltage on the line 60 is relatively low indicating that the water level in the vulcanizing tube is lower than a predetermined value, lower than the desired level, the output of the meter 70 will cause the control module 75 to energize the relay 72 and cause energization of the lamp 78 and an increase of the delivery rate of the pump 16 and/or energization of the auxiliary pump 21. Energization of the lamp 78 by the relay 72 will indicate to the operator at the control panel that the water level is excessively low. The lamp 78 may be replaced by, or associated with, a low water level alarm which is energized by way of the contacts 72a of the relay 72.

When the voltage on the line 60 is lower than the voltage which will cause the relay 72 to be energized, the output of the meter 70 causes energizaton of the relay 73, such voltage indicating excessively low water level in the vulcanizing tube 3. When the relay 73 is energized, it will energize the lamp 79, indicating to the operator an even lower water level in the vulcanizing tube 3, and close the steam valve 6 and/or open the steam dump valve 8 by way of the control 32. The lamp 79 may be replaced by, or be associated with an alarm which is energized by way of the contacts 73a of the relay 73.

Of course, the control panel may also have, associated with it, manually operable buttons which control switches connected to the pump, valve, etc., in the conventional manner so that the various devices may be manually operated as desired, particularly, during starting-up of the vulcanizing and extrusion apparatus.

In summary, the conductor feeding, insulation extrusion and the filling of the vulcanizing tube 3 are started manually in the conventional manner. When the desired level of the interface 39 (FIG. 2) is attained, the control systems (FIGS. 5 and 6) are energized and the potentiometer 61 (FIG. 5) is set to the level which will cause the meter 70 (FIG. 6) to indicate that the desired level is attained. The potentiometer 68 (FIG. 6) is also set so that the motor 23a (FIG. 6) maintains, by way of the valve 15 (FIG. 1), such desired level at which time the motor 23a will be at rest. As long as the interface 39 (FIG. 2) remains at the level which will cause the sensor 34 (FIG. 1) to provide an output voltage which, after processing in the singal conditioning circuitry 49 (FIGS. 4 and 5), is equal to the reference voltage set by means of the potentiometers 68 and 69 (FIG. 5), the motor 23a (FIG. 5), which operates the valve 15, will remain at rest. However, if the level of the interface 39 changes, the motor 23a will be operated to move the valve 15 (FIG. 1) in the opening direction or the closing direction, respectively, when the interface 39 lowers or when it rises. If the switch 24 (FIG. 1) is used, and the valve 15 is opened to about 88% of full open, the switch 24 will energize the drive 22 for the auxiliary pump 21 (FIG. 1) to increase the supply of water to the vulcanizing tube 3.

If the interface 39 becomes excessively high, as indicated by the portion of the voltage on the line 60 supplied to the meter 70 (FIG. 6) by way of the potentiometer 61 (FIG. 5), the water dump valve 28 (FIG. 1) will be open until the interface 39 is lowered to the desired level. At the time that the valve 28 is opened, the lamp 77 will light and if provided, an alarm will sound.

If the interface 39 lowers beyond a predetermined level, indicating that mere opening of the valve 15 (FIG. 1) is insufficient to maintain the desired level of the interface 39, the control module 75 (FIG. 6) will energize the relay 72 causing lighting of the lamp 78 and if provided, energization of an alarm. The relay 72 will also cause an increase in the pumping rate of the pump 16 (FIG. 1) and/or energize the auxiliary pump 21 (FIG. 1) if it has not already been energized by the switch 24 or if the switch 24 is not included in the system.

If the interface 39 lowers further, i.e. below the level which causes operation of the relay 72, then, the control module 76 (FIG. 6) will energize the relay 73 causing lighting of the lamp 79, and if provided, energization of an alarm. The relay 73 will also cause the steam valve 6 (FIG. 1) to close and/or the steam vent valve 8 (FIG. 1) to open to vent steam to the atmosphere.

From the foregoing, it will be apparent that the liquid level maintaining apparatus of the invention has numerous advantages. For example, all of the mechanical devices used, such as electrically operable valves, pumps, etc., are devices normally present in a vulcanizing plant of the type described, and therefore, to obtain the results of the invention, it is necessary to add only electrical devices which are simple and relatively inexpensive and which are reliable in operation. No added hydraulic or air systems are required as is required in some prior art apparatus. Also, the apparatus of the invention will compensate for changes in steam pressure without manual intervention.

In addition, since the only parts exposed to the vulcanizing conditions are the tube 42 and the float 46, fewer rust, sludge and other foreign matter problems are encountered as compared to prior art systems. The level of the interface 39 can be adjusted, and observed, from the control panel 27 without requiring that the operator move away from the control panel 27. The control of level of the interface 39 is precise and automatic, and rebalancing of the system, as required with prior art apparatus, is not required.

The use of the apparatus of the invention is not restricted to use with vulcanizing systems or to the control of the level of a liquid-gas interface. Instead, it may be used wherever there is an interface of two fluids having differences in density sufficient to permit the float 46 to respond to the level of the fluid of higher density.

Although preferred embodiments of the present invention have been described and illustrated, it will be apparent to those skilled in the art that various modifications may be made without departing from the principles of the invention.

I claim:

1. A catenary tube vulcanizer for vulcanizing extruded vulcanizable stock, said vulcanizer having a catenary tube through which the vulcanizable stock is passed and having a level control, a cooling medium supply line connected to one part of said tube, said vulcanizer further comprising:

a heating medium control valve on said heating medium line for controlling the supply of heating medium to said one part of said tube;

a cooling medium control valve on said cooling medium supply line for controlling the supply of cooling medium to said another part of said tube;

said level control comprising a magnetic float responsive to the level of said cooling medium in said tube and hence, to the interface between said cooling medium and said heating medium, and multiple switches controlled in accordance with the position of said float;

said cooling medium control valve having a bi-directional drive means for opening and closing said cooling medium control valve, said drive means being connected to said level control such as to be drivable one direction to close the water supply valve at a high cooling medium level and in another direction to open the cooling medium control valve upon occurrence of a low cooling medium level; and said heating control medium valve also being connected with said level control for control of said heating medium valve by said level control.

2. A catenary tube vulcanizer as set forth in claim 1 wherein said vulcanizer further comprises:
   a drain line connected to said another part of said tube for removing cooling medium from said tube;
   a drain control valve on said drain line;
   a vent line connected to said one part of said tube for venting heating medium from said tube;
   a vent control valve on said vent line;
   means connecting said drain control valve to said level control for opening said drain control valve when the level of said cooling medium exceeds a predetermined high level; and
   means connecting said vent valve to said level control for opening said vent control valve when the level of said cooling medium is less than a predetermined level.

3. Apparatus as set forth in claim 2 wherein said heating medium control valve is connected to said level control and wherein said level control closes said heating medium control valve when the voltage output of said first-mentioned voltage source has a predetermined value.

4. Apparatus as set forth in claim 2 wherein said vent control valve is opened by said level control when the voltage output of said first-mentioned voltage source has a predetermined value.

5. Apparatus as set forth in claim 2 wherein said drain control valve is opened by said level control when the voltage output of said first-mentioned voltage source has a predetermined value.

6. A catenary tube vulcanizer as set forth in claim 1 wherein said level control comprises:
   a measuring tube;
   means connecting different portions of said measuring tube to different portions of said catenary tube for fluid flow between said measuring tube and said catenary tube so that there is a fluid-fluid interface in said measuring tube between the ends thereof which corresponds in level to the level of the fluid-fluid interface in said catenary tube;
   said magnetic float being in said measuring tube and movable therein, said magnetic float having a buoyancy which causes it to assume a position corresponding to the fluid-fluid interface in said measuring tube; and
   a voltage source having magnetically responsive control means for varying the output thereof, said magnetically responsive control means being mounted adjacent to said measuring tube and being responsive to said magnetic float for varying the output of said source dependent on the position of said magnetic float.

7. Apparatus as set forth in claim 6 wherein said level control comprises an adjustable voltage source, a comparator having its input connected to the first-mentioned voltage source and to said adjustable voltage source for providing an output signal dependent on the difference between the voltage output of the first-mentioned voltage source and the voltage of said adjustable voltage source and means responsive to said output signal of said comparator connected to said comparator and to said one of said heating medium control valve and said cooling medium control valve for controlling the valve to which it is connected.

8. Apparatus as set forth in claim 6 wherein said voltage source is a voltage divider, said magnetically responsive control means is a plurality of magnetically responsive switches mounted outside said measuring tube and spaced from each other in the direction of the axis of said measuring tube and said measuring tube is made of non-magnetic material.

9. Apparatus as set forth in claim 8 wherein said bi-directional drive means comprises a bi-directional motor connected to said cooling medium control valve for opening and closing said last-mentioned valve.

10. Apparatus as set forth in claim 9 wherein said heating medium control valve is an electrically operable valve and wherein said level control is connected to said electrically operable valve.

11. Apparatus as set forth in claim 10 further comprising a fluid pump connected to said cooling medium supply line and wherein said level control is connected to said fluid pump for controlling the energization thereof.

12. Apparatus as set forth in claim 11 wherein said fluid pump is energized by said level control when the voltage output of said first-mentioned voltage source has a predetermined value.

13. Apparatus as set forth in claim 1 wherein said catenary tube has sealing means at its ends for fluid-tight engagement with the vulcanizable stock and said vulcanizable stock is a conductor having a vulcanizable material thereon, wherein said heating medium is a gas at a temperature above room temperature and under a pressure greater than atmospheric pressure, and wherein said cooling medium is a liquid at a temperature lower than the temperature of said gas and under the pressure of said gas.

14. Apparatus as set forth in claim 13 wherein said bi-directional drive means is a bi-directional motor having a first direction control for causing said motor to operate in a first direction which will cause said motor operable valve to move toward its full open position and a second direction control for causing said motor to operate in a second direction which will cause said motor operable valve to move toward its fully closed position and wherein said level control comprises:
   an adjustable voltage source;
   a first comparator connected to said adjustable voltage source and to said first-mentioned voltage source for providing an output signal dependent upon the difference between the output voltage of said first mentioned voltage source and the voltage of said adjustable voltage source;
   means connected to said first comparator and to said first direction control and responsive to the output signal of said first comparator for causing operation of said motor in said first direction;
   a second comparator connected to said adjustable voltage source and to said first-mentioned voltage source for providing an output signal dependent upon the difference between the output voltage of said first-mentioned voltage source and the voltage of said adjustable voltage source; and
   means connected to said comparator and to said second direction control and responsive to the output signal of said second comparator for causing operation of said motor in said second direction.

* * * * *